US009015167B1

(12) United States Patent
Ballou et al.

(10) Patent No.: US 9,015,167 B1
(45) Date of Patent: Apr. 21, 2015

(54) USER ISOLATED INDEXES FOR DETERMINING THE CONTEXT AND RELEVANCE OF RELATIONSHIPS

(71) Applicant: Tipbit Inc., Bellevue, WA (US)

(72) Inventors: Nathaniel Harper Ballou, Kirkland, WA (US); Gordon John Mangione, Kirkland, WA (US); Ewan Ellis Mellor, San Francisco, CA (US)

(73) Assignee: Tipbit Inc., Bellevue, WA (US)

( * ) Notice: Subject to any disclaimer, the term of this patent is extended or adjusted under 35 U.S.C. 154(b) by 1 day.

(21) Appl. No.: 14/165,316

(22) Filed: Jan. 27, 2014

(51) Int. Cl.
*G06F 17/30* (2006.01)
(52) U.S. Cl.
CPC ................. *G06F 17/30321* (2013.01)
(58) Field of Classification Search
CPC ............ G06F 17/30631; G06F 17/30613; G06F 17/30336; G06F 17/30604
USPC ................................. 707/741, 767
See application file for complete search history.

(56) References Cited

U.S. PATENT DOCUMENTS

| 7,467,157 B1* | 12/2008 | Chen et al. ........................... 1/1 |
| 2006/0080303 A1* | 4/2006 | Sargent et al. .................... 707/3 |
| 2008/0201302 A1* | 8/2008 | Kimchi et al. .................... 707/3 |
| 2008/0235204 A1* | 9/2008 | Dai et al. ........................... 707/5 |
| 2012/0084291 A1* | 4/2012 | Chung et al. ................... 707/741 |
| 2013/0159298 A1* | 6/2013 | Mason et al. ................. 707/728 |
| 2014/0201812 A1* | 7/2014 | Tarrago et al. ................... 726/3 |
| 2014/0222854 A1* | 8/2014 | Lee et al. ...................... 707/767 |

OTHER PUBLICATIONS

Official Communication for U.S. Appl. No. 13/946,801 mailed Oct. 24, 2013.

* cited by examiner

*Primary Examiner* — Noosha Arjomandi
(74) *Attorney, Agent, or Firm* — John W. Branch; Lowe Graham Jones PLLC

(57) ABSTRACT

Embodiments are directed towards generating user isolated indexes for determining the content and relevance of relationships. User indexes may be generated that correspond to individual users of a larger population of users. Client applications may be accessed to determine items corresponding to the users. Information corresponding to the determined items may be listed in a user index corresponding to each user. Also, other information associated with the users may be stored in a data store separate from the user indexes. A context associated with one or more determined item may be determined based on an analysis of content included in the determined items, or other information. User indexes may be updated based on the determined contexts. Updating the user indexes may include updating the user index of the user associated with the determined items and updating other user indexes.

26 Claims, 9 Drawing Sheets

USER ISOLATED INDEXES FOR DETERMINING THE CONTEXT AND RELEVANCE OF RELATIONSHIPS

TECHNICAL FIELD

The present invention relates generally to personal information management, and more particularly, but not exclusively, to generating indexes of relevant items to determine and provide items that are relevant to a query.

BACKGROUND

Today, people often utilize many different computing tools to manage personal information, communicate with others, manage meetings and tasks, and the like. Examples of such computing tools may include, but are not limited to, email, text messaging, instant messaging, calendaring tools, document management tools, address books, social media tools, other personal information managers, or the like. Sometimes, information from different computing tools may be related or relevant to each other, with or without the user's knowledge. In some instances a user may want to quickly access and/or share this relevant information with others. However, the user may have to perform multiple actions and/or separately access each computing tool to locate and/or access the related/relevant information.

For example, a person may want to forward an email about an upcoming meeting to others who are invited to the meeting. The person may have to open their calendar and locate the meeting entry. From here the user may have to write down the name of the meeting attendees. The person may then have to access their contacts list to obtain each attendee's email address from which the email can be forwarded. These additional steps to determine, locate, and/or access related/relevant information can lead to missing information, wasting time, user frustration, and the like. Thus, it is with respect to these considerations and others that the invention has been made.

DETAILED DESCRIPTION

Figure 1:
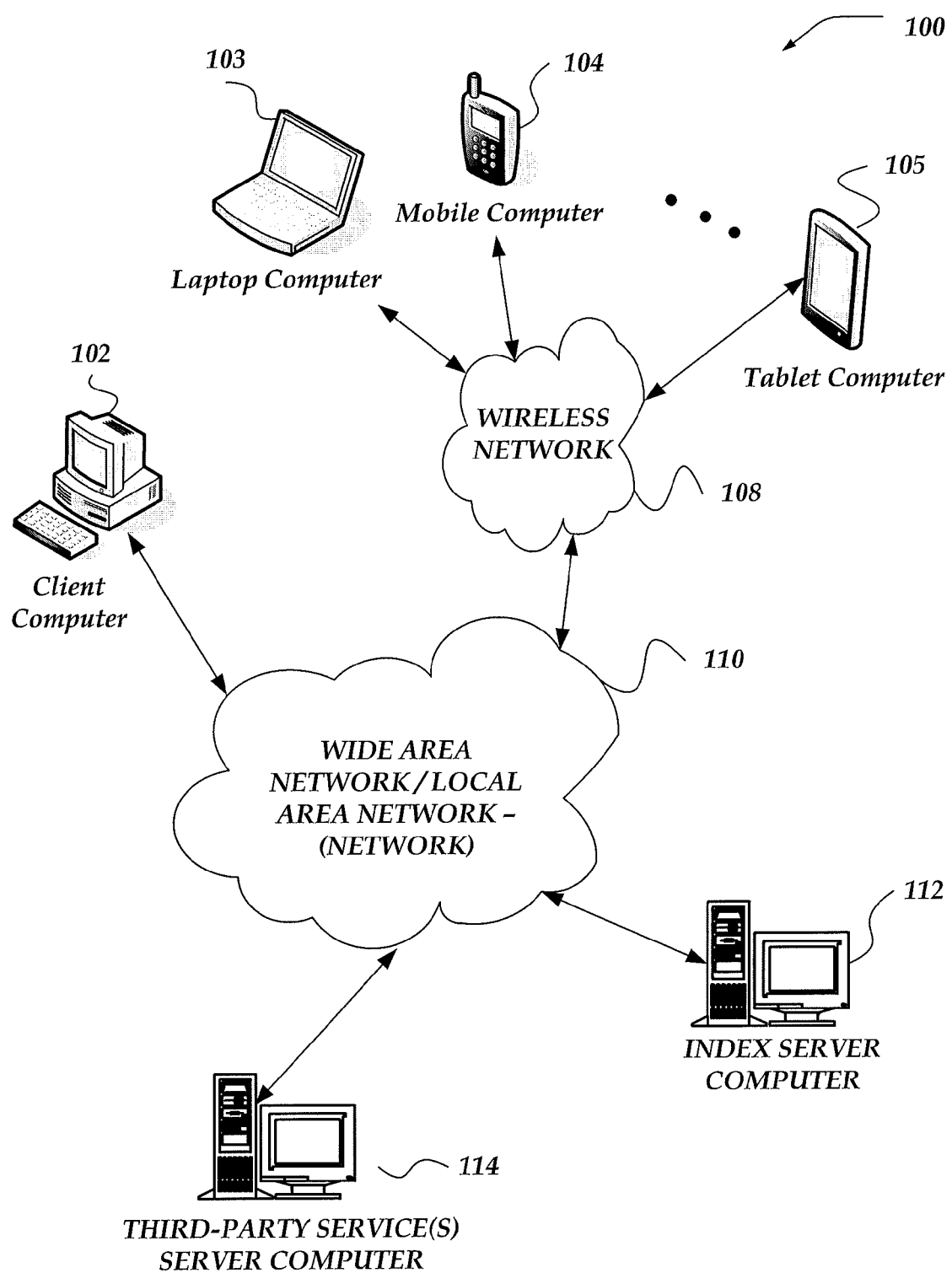
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, computers, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "item" may refer to information and/or data associated with a user. In some embodiments, items may include the user's content, which can include, but is not limited to contacts, documents, images, photograph, emails, calendar entries, tasks, events, appointments, other personal information management data, instant messages, text messages, social media information, or the like.

As used herein, the term "document information" may refer to information that includes meta-data for items. Document information may include header fields, size, author, owner, date of creation, last edited date, last edited by, change history, abstracts, image information (e.g., color depth, resolutions, file format, or the like), file format, or the like.

As used herein, the terms "behavior" and/or "user behavior" may refer to actions performed by a user on one or more items. In some embodiments, user behaviors may be monitored and/or tracked based on input and/or selections by a user. Examples of user behaviors may include, but are not limited to, moving an email from one folder to another folder, opening an email, an order of opening new emails, responding to emails, creating a calendar entry after viewing an email, sending an email while another document is open and/or being edited, or the like.

As used herein, the phrase "user information" may refer to items and/or user behaviors that are associated with a user. User information may be tracked, maintained, managed, and/or stored for each of a plurality of users. In some embodiments, the user information for each separate user may be stored separately. In other embodiments, user information for a plurality of users may be stored together (e.g., in a common data store).

As used herein, the phrase "personal information manager," or "PIM," may refer to an application, program, or other computer software—executing on a client computer, executing on a remote network computer, or web-based—that functions as a personal organizer for items. Although described as software, it should be understood that the functionality of a PIM may also be implemented in hardware or a combination of hardware and software.

As used herein, the phrase "third-party services" may refer services utilized by users of client computers that may store and/or maintain information separate and/or distinct from the client computers. Examples of third-party services may include, but are not limited to, personal information manager services, web-based email services, storage services, social media services, social networking services, or the like. Alternatively, third-party services may be referred to as external services. In at least one of the various embodiments, these third-party services may often provide one or more machine interfaces that enable communication and/or queries related to users of the services.

As used herein, the term "event" may refer to actions that the indexer application may be configured and/or arranged to determine events. Event may be determined using methods, such as, event monitoring, event capturing, or the like. Events may be actively monitored, such that an application and/or computer may be arranged to send events to an indexer. In other cases, the indexer may be arranged to passively monitor one or more applications to determine events. In at least one of the various embodiments, events may include, communications that include user behaviors, network traffic, email messages, document updates (e.g., deletes, edits, moving, sharing, or the like), messages or query results associated with third-party services, calendar updates (e.g., appointment edits, new appointments, adding/removing attendees, attendee responses, or the like), applications being installed/removed on a computer, or the like.

As used herein, the term "query" refers to commands and/or sequences of commands that are used for querying, searching and/or retrieving data from an indexer application, data store, user index, common index, or third-party server. Queries generally produce a result or results based on the form and structure of the particular query string. Query results may be sorted and grouped based on the structure and form of the query string. In at least one of the various embodiments, query strings may include operators and functions for calculating values based on the stored records, including functions that produce result sets that may include statistics and metrics about the data stored in data repository. Structured Query Language (SQL) is a well-known query language often used to form queries for relational databases. However, the various embodiments are not limited to using SQL-like formatting for query strings. Accordingly, other well known query languages and/or custom query languages may be employed consistent with what is claimed herein.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards generating user isolated indexes for determining the content and relevance of relationships. In at least one of the various embodiments, user indexes may be generated such that each user index corresponds to an individual user from a larger population of users. In at least one of the various embodiments, one or more applications operative on client computers may be accessed to determine the items that may correspond to a user. Information that may correspond to the determined item may be listed in the user index that corresponds to the user. In at least one of the various embodiments, accessing the applications may include classifying the determined items based on one or more classification types. In at least one of the various embodiments, classification types may include a person, a project, a message, a document, a meeting, an appointment, a location, a company, or the like.

In at least one of the various embodiments, one or more the determined items may be stored in data store separate from the user indexes. Also, in at least one of the various embodiments, information, such as, events may be associated with the user and may be stored in data store separate from the user indexes. In at least one of the various embodiments, other information that may be associated with one or more third-party services may be stored in the data store as well and associated with a user.

In at least one of the various embodiments, one or more contexts associated with the determined items may be determined based in part on an analysis of content included in the determined items, the events, or other information. In at least one of the various embodiments, determining a context associated with the determined items may include submitting one or more queries to one or more one third-party services. The queries may include information that may be based on the content of the determined items. A portion of the results of the one or more third-party service query may be employed to further determine the context that may be associated with one or more determined items. Furthermore, in at least one of the various embodiments, determining the context associated with determined items may include employing shareable information that may be stored in other user indexes to further determine the context that may be associated with the one or more determined items.

In at least one of the various embodiments, the user indexes may be updated based on the contexts determined for one or more of the determined items. In at least one of the various embodiments, updating the user indexes may include updating the user index of the user that may be associated with the one or more determined items and updating one or more other user indexes based on the determined context information.

In at least one of the various embodiments, one or more user roles may be determined based on one or more of the determined items and one or more user indexes. The determined user role may be a customer, a vendor, a supervisor, a project manager, an assistant, a family member, a casual friend, or the like.

Additionally, in at least one of the various embodiments, relevancy information for the one or more determined items may be determined based on aggregating information that may be located in one or more other user indexes. In at least one of the various embodiments, a common index that includes sharable information for at least one item may be generated. In at least one of the various embodiments, sharable information may include information associated with one or more items that may be accessible to two or more users.

ILLUSTRATIVE OPERATING ENVIRONMENT

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Index Server Computer 112, and Third-Party Service(s) Server Computer (TPSSC) 114.

At least one embodiment of client computers 102-105 is described in more detail below in conjunction with FIG. 2. In one embodiment, at least some of client computers 102-105 may operate over a wired and/or wireless network, such as networks 110 and/or 108. Generally, client computers 102-105 may include virtually any computing computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, an accounting server, a production server, an inventory server, or the like. However, client computers 102-105 are not constrained to these services and may also be employed, for example, as an end-user computing node, in other embodiments. It should be recognized that more or less client computers may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, smart mobile telephone 104, and tablet computers 105, and the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, and the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, RISD 112, TPSSC 114, or other computers.

Client computers 102-105 may further be configured to include a client application that enables an end-user to log into an end-user account that may be managed by another computer, such as index server computer 112, TPSSC 114, or the like. Such an end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like.

Network 110 is configured to couple network computers with other computers, including, index server computer 112, TPSSC 114, client computer 102, and client computers 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of index server computer 112 is described in more detail below in conjunction with FIG. 3. Briefly, however, index server computer 112 includes virtually any network computer capable of generating and storing one more user isolated indexes. Such indexes may include relevant items (e.g., documents) for users and be used in part to provide ranked relevant items to a user in response to a query. In at least one embodiment, index server computer 112 may access one or more application on client computers 102-105 and/or TPSSC 114 for items, events, or user behaviors to generate one data stores for user indexes and event. Computers that may be arranged to operate as index server computer 112 include various network computers, including, but not limited to personal computers, desktop computers, multiprocessor systems, microprocessor-based or programmable consumer electronics, network PCs, server computers, network appliances, and the like.

Although FIG. 1 illustrates index server computer 112 as a single computer, the invention is not so limited. For example, one or more functions of the index server computer 112 may be distributed across one or more distinct network computers. Moreover, index server computer 112 is not limited to a particular configuration. Thus, in one embodiment, index server computer 112 may contain a plurality of network computers. In another embodiment, index server computer 112 may contain a plurality of network computers that operate using a master/slave approach, where one of the plurality of network computers of index server computer 112 operates to manage and/or otherwise coordinate operations of the other network computers. In other embodiments, the index server computer 112 may operate as a plurality of network computers within a cluster architecture, a peer-to-peer architecture, and/or even within a cloud architecture. Thus, the invention is not to be construed as being limited to a single environment, and other configurations, and architectures are also envisaged.

One embodiment of TPSSC 114 is described in more detail below in conjunction with FIG. 3. Briefly, however, TPSSC 114 includes virtually any network computer capable of providing third-party services to users of client computers 102-105. TPSSC 114 may include, but is not limited to, personal information manager services, web-based email services, storage services, social media services, or the like. Computers that may be arranged to operate as TPSSC 114 include various network computers, including, but not limited to personal computers, desktop computers, multiprocessor systems, microprocessor-based or programmable consumer electronics, network PCs, server computers, network appliances, and the like.

Although FIG. 1 illustrates TPSSC 114 as a single computer, the invention is not so limited. For example, one or more functions of the TPSSC 114 may be distributed across one or more distinct network computers. Moreover, TPSSC 114 is not limited to a particular configuration. Thus, in one embodiment, TPSSC 114 may contain a plurality of network computers. In another embodiment, TPSSC 114 may contain a plurality of network computers where one of the plurality of network computers of TPSSC 114 operates to manage and/or otherwise coordinate operations of the other network computers. In other embodiments, the TPSSC 114 may operate as a plurality of network computers within a cluster architecture, a peer-to-peer architecture, and/or even within a cloud architecture. Thus, the invention is not to be construed as being limited to a single environment, and other configurations, and architectures are also envisaged.

Illustrative Client Computer

Figure 2:
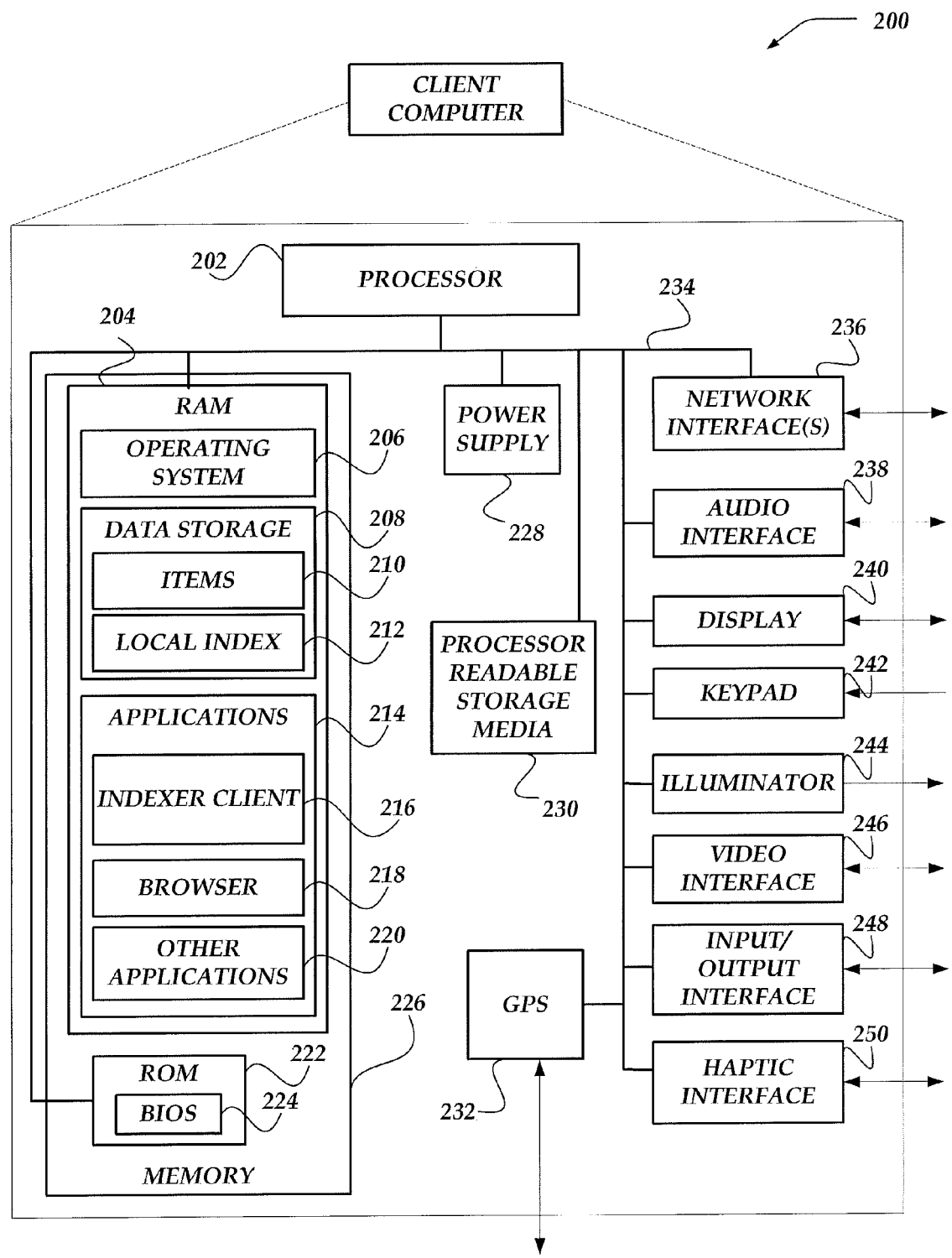
FIG. 2 shows one embodiment of a client computer that may be included in a system implementing embodiments of the invention.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. Data storage 208 may, in some embodiments, store items 210. Items 210 may include items associated with a user of client computer 200. In various embodiments, items 210 may be crawled by other computers, such as, but not limited to, index server computer 112 of FIG. 1. Also, in at least one of the various embodiments, items 210 may accessed by indexer client 216. Further, in at least one of the various embodiments, local index 212 may include data for a local index of a portion to the information that may be scanned and cataloged by indexer client 216. At least a portion of the information may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, indexer client 216, browser 218, and other applications 220.

Indexer client 216 may be a arranged to perform accessing and determining items located on one or more application operative on the client computer. In some embodiments, indexer client 216 may be a stand-alone application, an add-in and/or component of another application, or the like. In various embodiments, indexer client 216 may be enabled to communicate with index server computer 112 of FIG. 1 to provide items 210 for storage in data store for the user of client computer 200. In at least one of various embodiments, indexer client 216 may be configured to enable a user to provide a query for relevant items (e.g., enabling a user to select an item and providing an item identifier of the selected to index server computer 112 of FIG. 1.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as TPSSC 114 of FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Illustrative Network Computer

Figure 3:
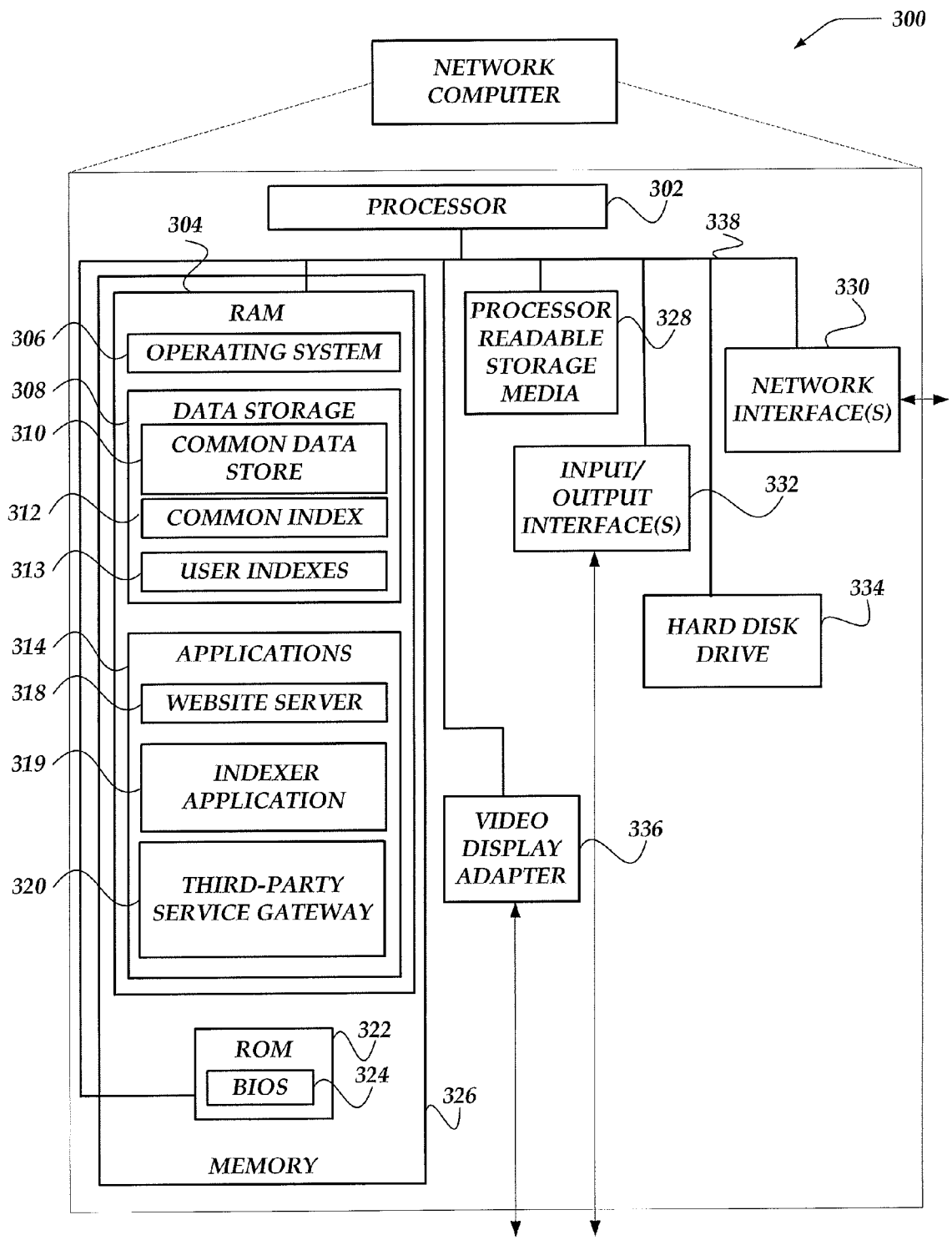
FIG. 3 shows one embodiment of a network computer, according to one embodiment of the invention.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example index server computer 112 and/or TPSSC 114 of FIG. 1, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within client computer 300

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include common data store 310, common index 312, and/or user indexes 313. Common data store 310 may include information from a plurality of different users. In some embodiments, common index 312 may include information may be utilized to generate an index of relevant items for one or more users.

Common index 312 may include an index of relevant items for a plurality of different users. In some embodiments, common index 312 may include a generic index of relevant items that may be utilized to determine ranked relevant items across the plurality of users in response to a query by a user. Common index 312 for a user may include an entry for each item in common data store 310 for those items that are relevant to the entry. In some embodiments, the relevant items for an entry in common index 312 may be rank ordered and/or grouped based on a degree of relevancy to the entry item. User indexes 313 may include index of items for a single user. User indexes 313 may be arranged to isolate data belonging to users from other users.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, Indexer Application 319, or Third-Party Service Gateway 320.

Website server 318 may represents any of a variety of information and services that are configured to provide content, including messages, over a network to another computer. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Indexer Application 319 may be configured to generate one or more indexes for users and providing ranked relevant items to a user in response to a query. Also, Indexer Application 319 may be arranged to generate one or more common indexes and/or common data stores for storing and organization data that may be of common interest or use. In at least one embodiment, Indexer Application 319 may be configured to communicate with Indexer Client 216 of FIG. 2. In some cases Indexer Application 319 may direct Indexer Client 216 to scan (e.g., crawl) the data on a client computers to identify user's items and/or behaviors, receive a query for relevant items, and/or provide a subset of ranked relevant items for display to the user. In other embodiments, Indexer Application 319 may be configured to communicate with TPSSC 114 of FIG. 1 search for items and/or user behaviors to generate data stores for users. In some embodiments, Indexer Application 319 may be employed by index server computer 112 of FIG. 1. Indexer Application 319 may be arranged to use machine learning and other similar methods for analyzing items, indexes, user behaviors, or the like. Such analysis may be employed as part of determine contexts, relationships, roles, and associations between users and items based on the combination of information from common data store 310, common index 312, user indexers, or the like.

Third-Party Service Gateway 320 may be configured to provide access to third-party services, such as, but not limited to, personal information manager services, web-based email services, storage services, social media services, or the like. In some embodiments, Third-Party Service Gateway 320 may be employed by index server computer 112 to access TPSSC 114 of FIG. 1.

In any event, Indexer Application 319, and Third-party Service Gateway 320 may employ processes, or parts of processes, similar to those described in conjunction with FIGS. 5-9, to perform at least some actions.

Illustrative Logical System

Figure 4:
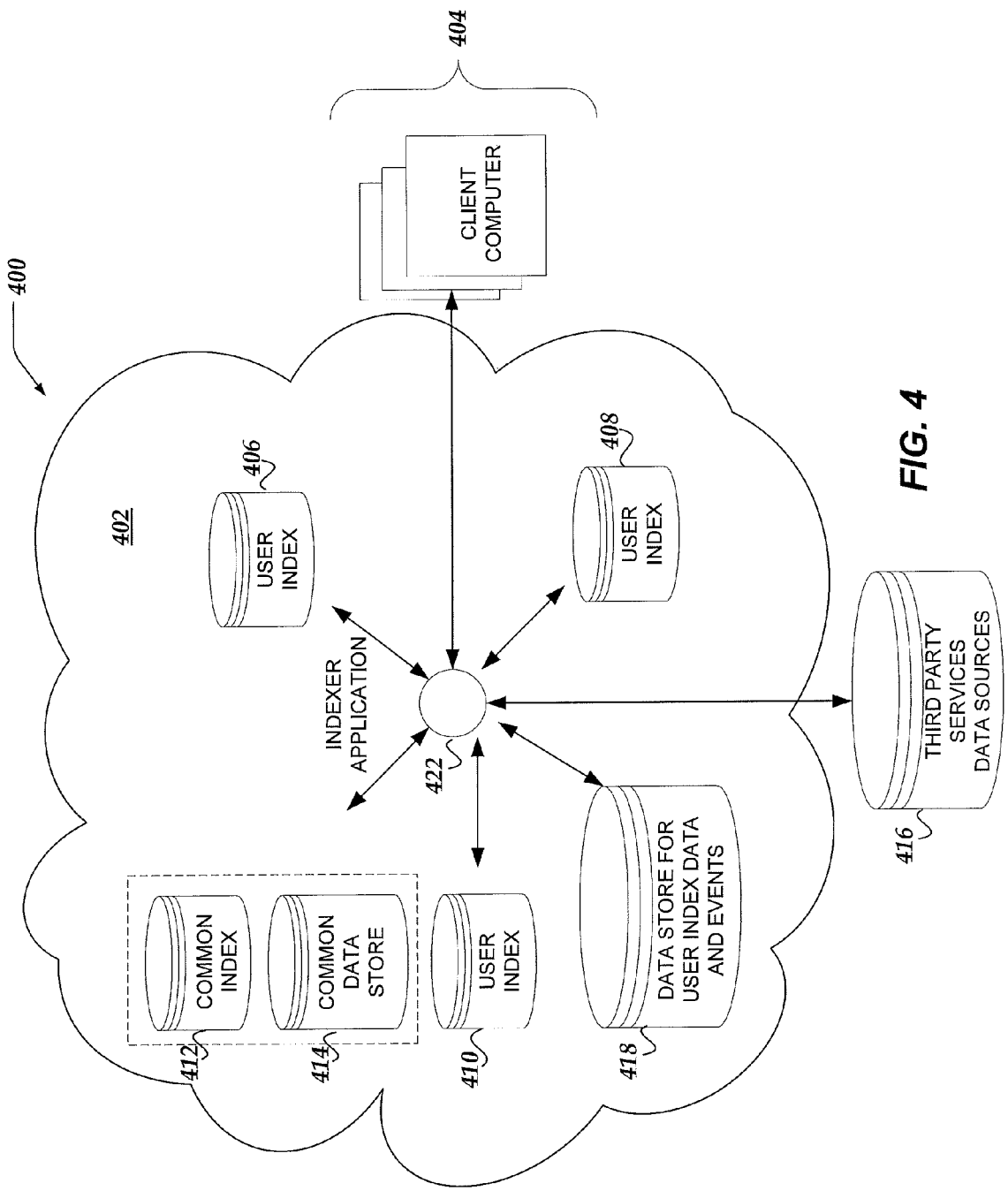
FIG. 4 shows a logical diagram of a system for user isolated indexes for determining the content and relevance of relationships in accordance with at least one of the various embodiments.

FIG. 4 shows a logical diagram of system 400 for user isolated indexes for determining the content and relevance of relationships in accordance with at least one of the various embodiments. In at least one of the various embodiments, system 400 may be arranged as one or more processes and data stores that may be operative a network environment, such as, network 402. Network 402 may be a cloud-based environment with one or more server computers interconnected over one or more networks. Components operative in network 402 may communicate over one or more networks with one or more client computers, such as client computers 404.

In at least one of the various embodiments, system 400 may comprise one or more user indexes, such as user index 406, user index 408, and user index 410. In at least one of the various embodiments, user indexes may be arranged to store index data related to items owned by an individual user. Such index data may be employ for various purposes, including identifying items, locating items, ranking items, grouping items, sorting items, or the like.

In at least one of the various embodiments, system 400 may monitor and/or collect one or more events, items, user behaviors, or the like. In at least one of the various embodiments, common data store 414 may be a data store configured to store records of the monitored and/or collected information. In at least one of the various embodiments, common data store 414 may be implemented using one or more storage systems that may span one or more server computers. In at least one of the various embodiments, some or all of the data in common data store 414 may be accessed by system 400 over another network. Likewise, in at least one of the various embodiments, common data store 414 may be mirrored and/or replicated in separate physical and/or virtual locations.

In at least one of the various embodiments, common index 412 may be a data store of index data for common data store 414. In at least one of the various embodiments, common index 412 may be arranged to store index data related to items shared by or common to a plurality of individual users. Such index data may be employed for various purposes, including identifying common items, common locating common items, ranking common items, grouping common items, sorting common items, or the like. In at least one of the various embodiments, common index 412 may be implemented using one or more storage systems that may span one or more server computers. In at least one of the various embodiments, some or all of the index data in common index 412 may be accessed by system 400 over another network. Likewise, in at least one of the various embodiments, common index 412 may be mirrored and/or replicated in separate physical and/or virtual locations.

In at least one of the various embodiments, third party data 416 as shown in system 400 represents one or more third party services that may be accessed by indexer application 319. In at least one of the various embodiments, third party data 416 may be accessed using an application such as third-party gateway 320. Third-party Service Gateway 320 may enable Indexer Application 319 to access third-party services using one or more well-known communication API's offered by the third-party services. For example, to encourage integration with other services, commercial third-party services often publish API's that may be employed to access data and services.

In at least one of the various embodiments, data store 418 may be a large scale database for collecting events, event information, document information, contexts, roles, relationships, relevancy information, user behaviors, items, queries, query results, third-party services information, or the like. In at least one of the various embodiments, events generated by client computers 404 may be captured and stored in data store 418. Also, in at least one of the various embodiments, user indexes, such as, user index 406, 408, or 410, may be arranged to reference listed information that may be separately stored in data store 418.

In at least one of the various embodiments, Third-party Service Gateway 320 may be arranged to provide a common interface layer that may be used for Indexer Application 319 to communicate with various third-party services.

In at least one of the various embodiments, indexer application 422 may comprise processes and/or applications for generating user indexes, contexts, common data stores, common indexes, communicating with third party data services, responding to client queries, monitoring user activity, determining events, determining roles, determining relationships, determining and/or collecting user documents and/or items, or the like. Accordingly, in at least one of the various embodiments, indexer application 422 may include applications, such as, indexer application 319, or the like. Further, even though for convenience indexer application 422 is illustrated as a single object/component in system 400, one of ordinary skill in the art, will appreciate that indexer application 422 may be comprised of one or more applications, network computers, virtual machines, processes, or the like. Elements that may comprise indexer application 422 may communicate with other portions of system 400 over a network such as network 402, or in at least one of the various embodiments, one or more portions of indexer application 422 may communicate with other portions of system 400 or other various other networks. In at least one of the various embodiments, one or more instances of indexer application 422 may be running on or more physical and/or virtual machines.

In at least one of the various embodiments, indexer application 422 may be arranged to actively and/or passively collect the information used to generate user indexes (e.g., user index 406, user index 408, user index 410), common index 412, common data store 414, and data store 418. In at least one of the various embodiments, the information may be determined by monitoring one or more communications provided by indexer client application, such as indexer client application 216. Also, in at least one of the various embodiments, information may be determined by passively monitoring the flow of information between client applications and other systems. For example, indexer application 422 may monitor the traffic passing through an email server application to determine information for the various indexes and/or data stores. In at least one of the various embodiments, some or all of the information determined by indexer application 422 may be stored in user indexes 406-410, common index 412, common data store 414, data store for user index data and events 418, or the like.

In at least one of the various embodiments, information collected by indexer application 422 may be analyzed to identify contexts, relationships and/or roles that may be related to various users. For example, email messages exchanged between various users may be used to passively identify project teams. In this case, the indexer application may scan email messages to identify groups of users that may often be communicating about the same subject matter. From these communications the indexer application may apply one or more policy rules to infer that the users involved in the email conversation may be in a project team. Thus, the relevant user indexes may be updated to reflect the project team relationship(s).

In at least one of the various embodiments, one or more application operative on client computers 404 may submit queries to indexer application 422. In at least one of the various embodiments, queries may be generated for in response to various stimuli, such as, user interaction with items, occurrence of events, or the like. For example, if a user opens a calendar application, the calendar application may submit one or more queries to indexer application 422 that include the names of the participants in upcoming meetings. Indexer application 422 may use the information in the query to identity additional context information and/or relationships that may be of interest to the user of the client computer. For example, if the users in the meeting are determined to be in a previously identified project team, the indexer application may provide a result set that includes one or more items relevant to the project that may be likely to be the subject of the meeting.

In at least one of the various embodiments, the result set may include additional publically available information such as photos of the meeting participants, lists of one or more persons that meeting members know in common, other items the may be provided for display in the calendar application that may be determined be relevant based on content, time of use, or the like.

In at least one of the various embodiments, for determining context, indexer application 422 may employ information stored in other users' indexes but this information may remain isolated and private from the other users. For example, Jim's user index may include information that indicates that Jim is an important member of the team. In this example, the determination may be made because Jim owns many items associated with the project, such as, emails, project plans, meetings, or the like. Thus, if responding to a query that has results that include Jim and/or Jim's documents, the indexer application may indicate that Jim is an important member of the project team (e.g., putting him and/or document associated with Jim at the top of the result set.) Note, none of Jim's private information may be returned in response to another user's query. Likewise, if Frank's index includes emails related to the project that he has been blind-carbon copied (BCC'd) on, the indexer application may be arranged to not report Frank's relationship to members of the project team, unless members have other "public" visibility to Frank's involvement with the project.

In at least one of the various embodiments, indexer application 422 may be arranged to monitor the times and places (if geo-information is available) a user access certain applications. For example, if user Jim has a habit of reading his email at 9:30 am, indexer application 422 may generate and run one or more queries associated with unread email in Jim's email inbox before Jim actually opens the one or more email items.

Also, in at least one of the various embodiments, indexer application 422 may monitor user behavior such as, which emails the user tends to open first. For example, if a user always reads email from Joe first (perhaps Joe is a project leader) indexer application 422 may generate and run a query about Joe before the user's client computer submits a query. Also, in some embodiments, indexer application 422 may provide the query results to the client computer before the relevant item is opened by the user. For example, by the time the user opens the first email from Joe, the local client application may have received information regarding Joe included in a result set of a query executed before the user opened his or her email application. Thus, the relevant supporting information included in the result set of the query may be available and/or displayed while the user reads Joe's email.

Generalized Operation

The operation of certain aspects of the invention will now be described with respect to FIGS. 5-9. In at least one of various embodiments, processes 500, 600, 700, 800, and 900 described in conjunction with FIGS. 5-9, respectively, may be implemented by and/or executed on a single network computer, such as network computer 300 of FIG. 3. In other embodiments, these processes or portions of these processes may be implemented by and/or executed on a plurality of network computers, such as network computer 300 of FIG. 3. However, embodiments are not so limited and various combinations of network computers, or the like, may be utilized.

Figure 5:
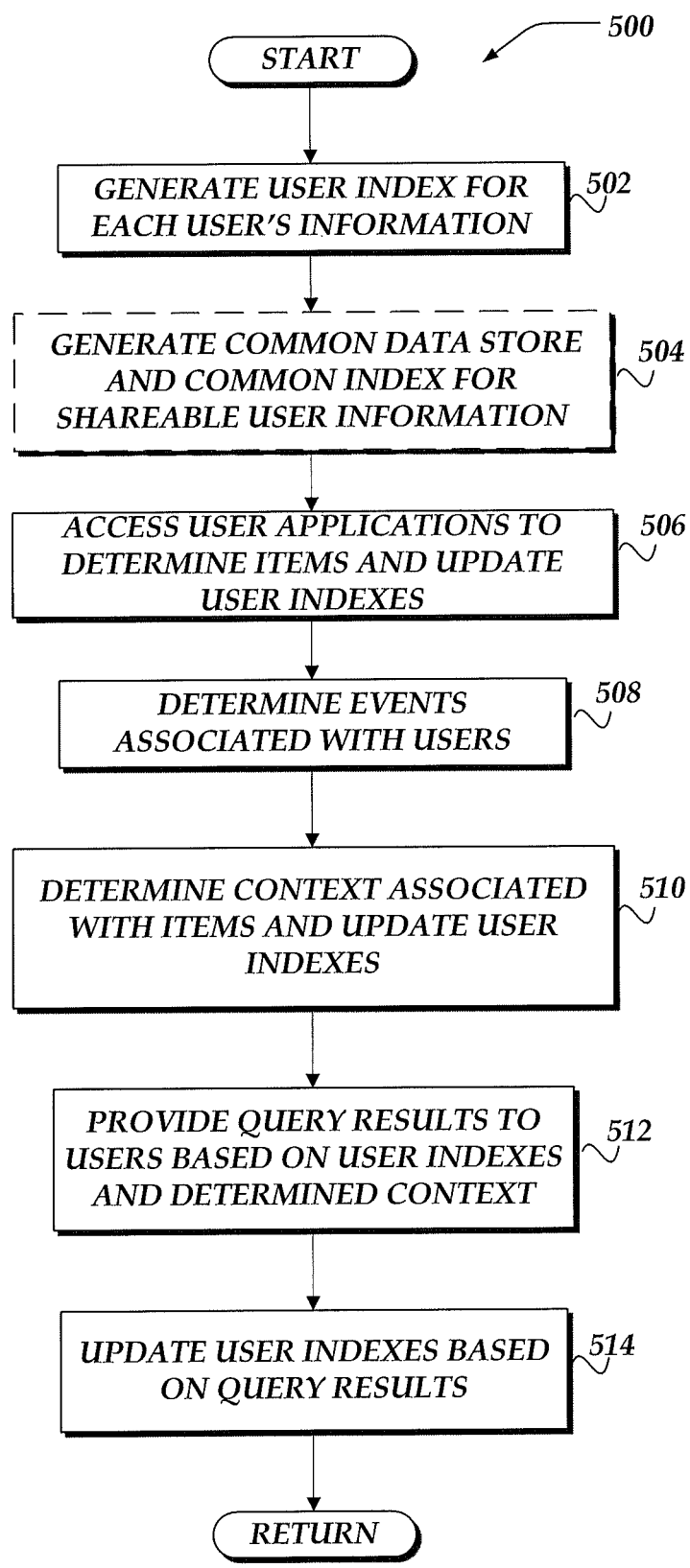
FIG. 5 shows an overview flowchart of a process for generating and employing user isolated indexes for determining the content and relevance of relationships in accordance with at least one of the various embodiments.

FIG. 5 shows an overview flowchart of process 500 for generating and employing user isolated indexes for determining the content and relevance of relationships in accordance with at least one of the various embodiments. After a start block, at block 502, in at least one of the various embodiments, at least one user index for each user's information may be generated. In at least one of the various embodiments, each user index may be arranged to include events, event information, document information, contexts, roles, relationships, relevancy information, user behaviors, items, queries, query results, third-party services information, or the like, for an individual user.

At block 504, in at least one of the various embodiments, optionally, one or more common data stores and/or common index for shareable information may be generated. In at least one of the various embodiments, the common indexes may be generated based on events, event information, document information, contexts, roles, relationships, user behaviors, items, queries, query results, third-party services information, or the like, some or all of which may be stored in a separate data store. Also, in at least one of the various embodiments, common indexes may reference information stored in the common data stores. In at least one of the various embodiments, common data store and/or common indexes may include events, event information, document information, contexts, roles, relationships, relevancy information, user behaviors, items, queries, query results, third-party services information, or the like, that may be sharable with one or more users that may be included in a common community. In at least one of the various embodiments, events, event information, document information, contexts, roles, relationships, relevancy information, user behaviors, items, queries, query results, third-party services information, or the like, may be determined to be sharable based on configuration settings, policy based rules, operating permission settings, access control lists, availability/visibility to the public, or the like.

At block 506, in at least one of the various embodiments, some or all of the applications associated with the one or more users may be accessed, such as, by a scan performed by the indexer application to determine items that are subsequently listed in user indexes updating one or more user indexes. In at least one of the various embodiments, the scanning may include computers such as client computers, network computers, mobile computers, or the like. Scanning may be arranged to identify and/or classify the items, such as, documents, corresponding to a user. Further, in at least one of the various embodiments, scanning may include local or remote locations where user items associated with application may be stored, including, email storage, cloud-based document storage, archives, shared file storage, contacts, address books, application log files, operating system log files, event records, or the like.

In at least one of the various embodiments, some or all the information determined during scanning may be stored in the user index that corresponds to the user. In at least one of the various embodiments, some or all of the information determined by the indexer application may be stored in a data store separate from the user indexes. Also, in at least one of the various embodiments, some or all of the information employed to generate the user indexes may be left in place at its originally determined location. For example, email messages that have been scanned may be left in the email mailbox where they were found. Continuing with this example, in some cases, some or all of the email messages may be copied and stored in the data store, user indexes, common indexes, or common data store, depending on other factors such as message size, or the like.

At block 508, in at least one of the various embodiments, one or more events associated with the users may be determined. In at least one of the various embodiments, information may be received from users, including, events, items, user behaviors, queries, or the like. In at least one of the various embodiments, such information may be provided by one or more client applications that may be employed by one or more users. Also, in at least one of the various embodiments, the information may be collected by one or more passive or active monitoring processes that may operative on index server computer 112, or employed by indexer application 319, or indexer client 216. In at least one of the various embodiments, the information, including events, items, user behaviors, queries, or the like may be stored separately in a data store such as data store 418.

At block 510, in at least one of the various embodiments, context information may be determined that may be associated with the determined items and the user indexes updated accordingly. In at least one of the various embodiments, the context information may be determined in part based on an analysis of the content of the items, some or all of the events, or the like, or combination thereof. In at least one of the various embodiments, the context information may enable the indexer application to determine modifications and/or adaptations to user indexes that may improve the performance of the user indexes and the relevancy of query results. For example, if an analysis of indexed information reveals that users, Jim, John and Jill are in a project group their respective user indexes may be updated to reflect their membership in the same project group. For example, in at least one of the various embodiments, Jim, John and Jill may be determined to be included and/or participate in emails that have the same or similar subject line. Thus, for example, the indexer application may infer that Jim, John and Jill are in a project group and their user indexes may be updated accordingly.

At block 512, in at least one of the various embodiments, in response to one or more queries, query results may be provided to users based on their user index, the common index, third-party services data, or the like, or combination thereof. Also, in at least one of the various embodiments, result sets may include information based on the relationships, roles, or contexts that may have been determined by the indexer application. In at least one of the various embodiments, queries may be generated on one or more one or more client applications that may be arranged to submit queries on behalf of a user.

At block 514, in at least one of the various embodiments, during ongoing operations, one or more indexes, including the common index, and relevant user indexes may be continuously updated and/or modified based on events, event information, document information, contexts, roles, relationships, relevancy information, user behaviors, items, queries, query results, third-party services information, or the like.

In at least one of the various embodiments, the indexer application may improve the user and common indexes by adjusting one or more weighting/sorting scores that may be associated with items in a particular index. For example, if the indexer application determines that two or more users may be members of the same group, it may tag items associated with group members to indicate that those items may be associated with any group member may be determined to have relevance to other members in the group. Next, in at least one of the various embodiments, control may be returned to a calling process.

Figure 6:
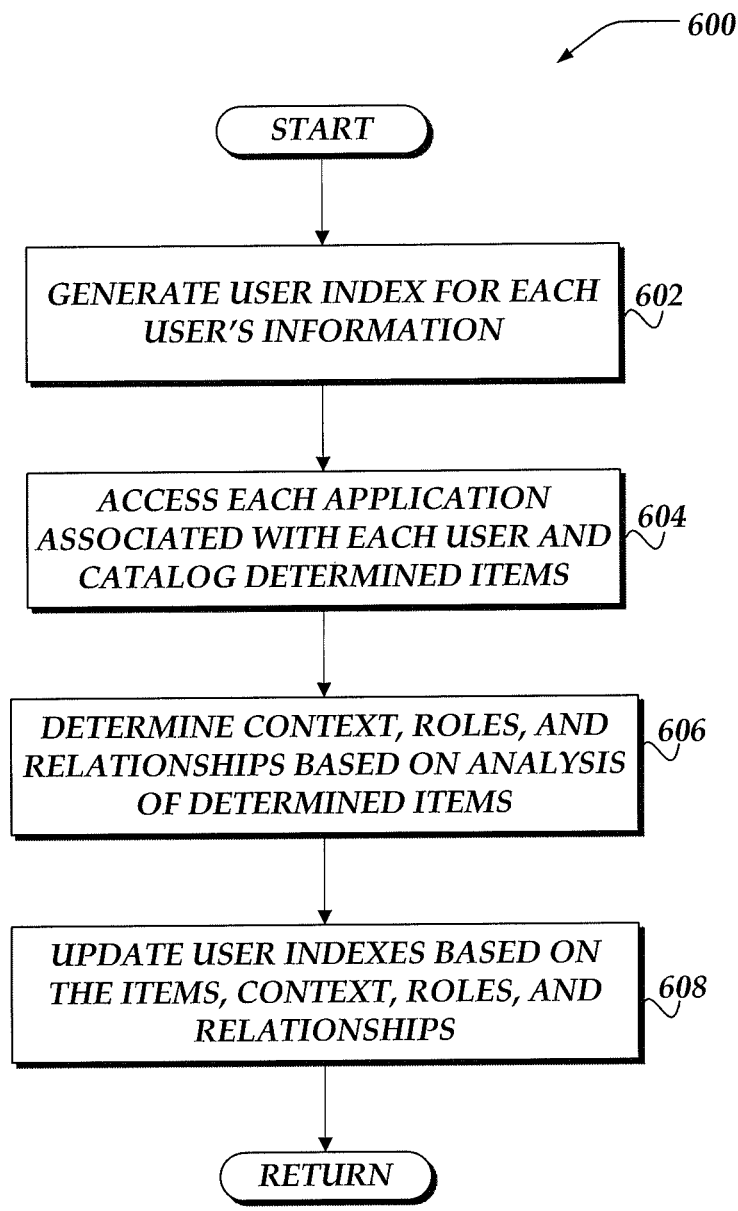
FIG. 6 shows a flowchart of process a for generating user indexes, in accordance with at least one of the various embodiments.

FIG. 6 shows a flowchart of process 600 for generating user indexes, in accordance with at least one of the various embodiments. After a start block, at block 602, in at least one of the various embodiments, a user index for some or all of one or more users' information may be generated. In at least one of the various embodiments, the user indexes may be located on a local or remote computer, such as, index server computer 112, network computer 300, or system 400. Also, in at least one of the various embodiments, user indexes may be located on one or more virtual machines and/or in a cloud-based environment.

At block 604, in at least one of the various embodiments, one or more applications associated with each user may be accessed to determine one or more items. The determined items may be cataloged and/or otherwise associated with the user.

In at least one of the various embodiments, the indexer application may access the items the items by scanning the applications on a client computer by communicating with an indexer client that may be resident on each client computer. In at least one of the various embodiments, the indexer client may determine information about the items located on application resident on the client computer to the indexer application. In some cases, the indexer application may obtain information about user items by scanning items corresponding to the user but stored elsewhere, such as, social network information, email messages, information in general purpose search engines, or the like. In at least one of the various embodiments, the determined information may include, events, event information, document information, contexts, roles, relationships, relevancy information, user behaviors, items, queries, query results, third-party services information, or the like, for an individual user.

At block 606, in at least one of the various embodiments, context information, one or more roles, or one or more relationships may be determined based on an analysis of information that includes, user index may be arranged to include events, event information, document information, contexts, roles, relationships, relevancy information, user behaviors, the determined items, queries, query results, third-party services information, or the like, for an individual user. In at least one of the various embodiments, determining context information may result in the identification of one or more objects, such as, objects such as, persons, places, projects, companies, or the like.

At block 608, in at least one of the various embodiments, user indexes may be updated based on the determined items, the determined context information, determined roles, events, event information, document information, contexts, roles, relationships, relevancy information, user behaviors, items, queries, query results, third-party services information, or the like. In at least one of the various embodiments, the indexer application may employ one or more well-known techniques for generating the user indexes. In at least one of the various embodiments, a user index may be arranged into one or more search-engine style indexes, such as, inverted indexes, forward indexes, suffix indexes, or the like, or combination thereof. Also, in at least one of the various embodiments, user indexes may be comprised database-style indexes, such as, b-trees, balanced trees, hashes, or the like, or combination thereof.

In at least one of the various embodiments, the user index may be arranged to generate various index classification types, such as, persons, projects, messages, documents, appointments, locations, companies, or the like. Thus, in at least one of the various embodiments, items may be classified and/or indexed based on their classification. Accordingly, in at least one of the various embodiments, one or more of the determined items may be classified based on at least one classification type, such as, a person, a project, a message, a documents, a meeting, an appointment, a location, a company, or the like, or combination thereof. For example, in some embodiments, an email message may be classified as a document and a message.

Also, in at least one of the various embodiments, index keys employed in the user indexes, such as, persons may be generated based on analyzing the content of items. For example, persons may be identified from information in the address header fields of email messages. For example, an email sent to four persons may be used to generate five keys in the person category, the four recipients and the sender. Subsequently, reference to other items associated to those five persons may be added to the user indexes. Likewise, project names in emails or included in other information may be determined and included the user indexes and/or common index.

In at least one of the various embodiments, as information, context, roles, relationships, are determined regarding objects such as, persons, places, projects, companies, or the like, the indexer application may store them in the common index or user indexes. Thus, overtime the portfolio of information about these objects may become more detailed and complete.

In at least one of the various embodiments, user indexes may be arranged to be responsive to queries from the user that corresponds to the user index excluding from access by other users. One or more well-known techniques may be employed to secure the user indexes from unauthorized access, including public-private key pairs, password protection, access control lists, limiting access to particular computers, or the like. In at least one of the various embodiments, user indexes may be encrypted to prevent unauthorized access in the event of a data breach. Next, in at least one of the various embodiments, control may be returned to a calling process.

Figure 7:
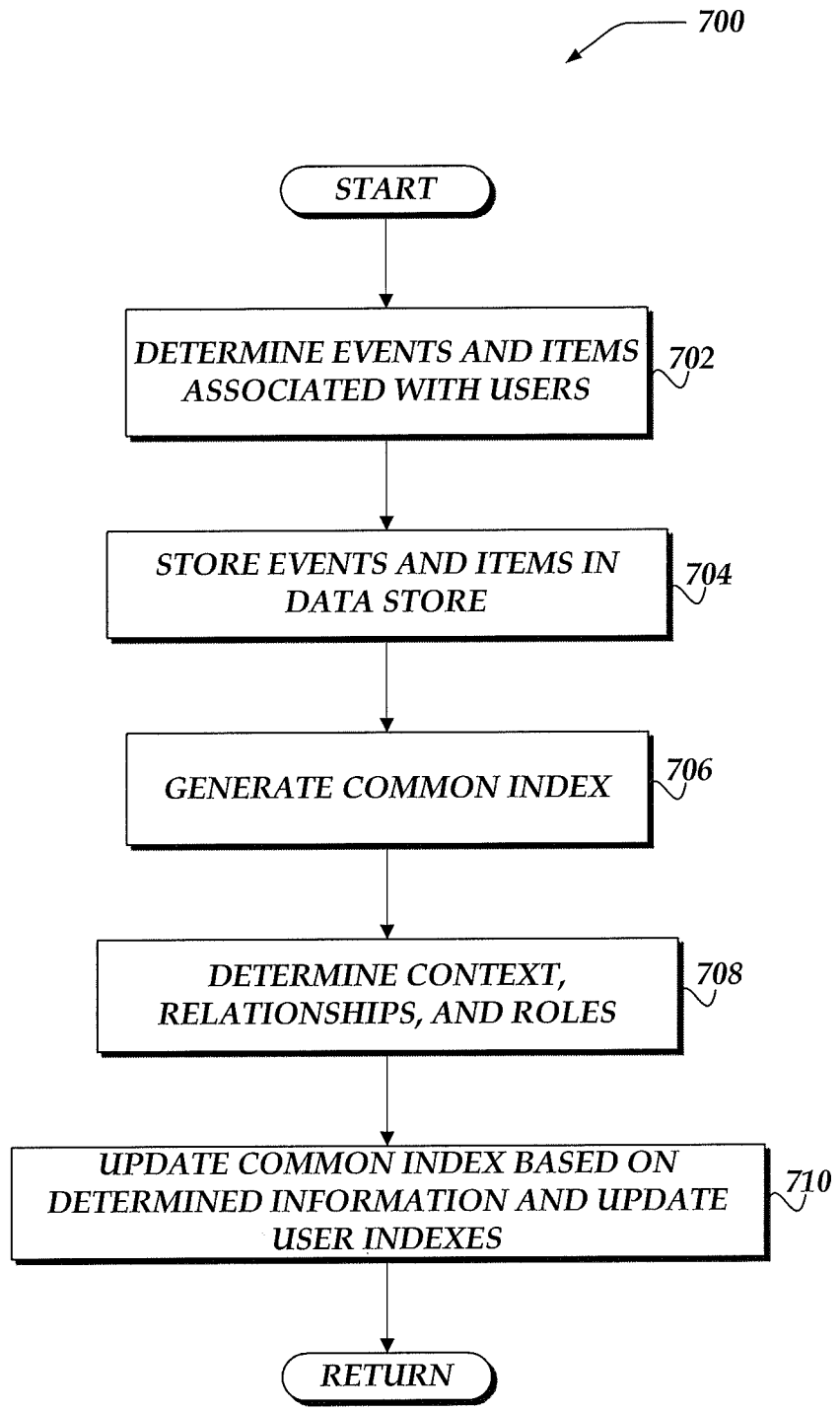
FIG. 7 shows a flowchart of a process for generating a common data store and common index in accordance with at least one of the various embodiments.

FIG. 7 shows a flowchart of process 700 for generating a common data store and common index in accordance with at least one of the various embodiments. In at least one of the various embodiments, a common index may be arranged to include events, event information, document information, contexts, roles, relationships, relevancy information, user behaviors, items, queries, query results, third-party services information that is sharable to one or more users.

After a start block, at block 702, in at least one of the various embodiments, information may be determined including, events, event information, document information, contexts, roles, relationships, relevancy information, user behaviors, items, queries, query results, third-party services information, or the like. In at least one of the various embodiments, the determined information may be accessed from one or more client applications. Also, in at least one of the various embodiments, the information may be determined by one or more passive or active monitoring processes that may operative on index server computer 112, or employed by indexer application 319, or indexer client 216.

At block 704, in at least one of the various embodiments, all or a portion of the determined information may be stored in a data store. The data store may be arranged to include events, event information, document information, contexts, roles, relationships, relevancy information, user behaviors, items, queries, query results, third-party services information, or the like.

In at least one of the various embodiments, information stored in a data store may be tagged to identify its corresponding user, if any. In at least one of the various embodiments, information tagged as corresponding to one user may be unavailable to other users. However, the indexer application may have access to all of the information in the data store to determine context information, relationships, and/or roles.

In at least one of the various embodiments, the data store may include information generated from publically available sources, including third-party services, such as, social networks, news organizations, public websites, or the like. For example, the indexer application may query one or more public search engines, social networks, databases, or the like. For example, in some cases, if a query includes a person's name, in addition to results based on the user indexes and/or common index, the indexer application may be configured to query one or more public search engines for information about the person. In at least one of the various embodiments, one or more of the results provided by the third party service may be stored in the data store, the user indexes, common index, or the common data store.

In at least one of the various embodiments, the common data store may be arranged to include events, event information, document information, contexts, roles, relationships, relevancy information, user behaviors, items, queries, query results, third-party services information, or the like. Some or all of the determined information may be stored in a local or remote common data store that may be separate from the user indexes, the common index, and/or the data store. In at least one of the various embodiments, configuration information may include policy based rules for determining whether information may be stored in a common data store or in a data store.

At block 706, in at least one of the various embodiments, a common index may be generated from information stored in the data store and/or the common data store. In at least one of the various embodiments, indexer application 319 may be arranged to generate a common index. In at least one of the various embodiments, the common index may list information that includes references to information stored separate in the data store. Likewise, in at least one of the various embodiments, the common index may list information that includes references to information stored separate in the data store.

In at least one of the various embodiments, the indexer application may employ one or more well-known techniques for generating the common index from the data in the data store and/or the common data store. A common index may be arranged into one or more search-engine style indexes, such as, inverted indexes, forward indexes, suffix indexes, or the like, or combination thereof. Also, in at least one of the various embodiments, common indexes may be comprised of database-style indexes, such as, b-trees, balanced trees, hashes, or the like, or combination thereof.

In at least one of the various embodiments, similar to user indexes, the common index may include classification types, such as, persons, projects, messages, documents, appointments, locations, companies, or the like. Thus, in at least one of the various embodiments, items may be listed and/or indexed based on their classification.

At block 708, in at least one of the various embodiments, context information, one or more relationships and roles may be determined based on information from the data store, the common index, user indexes, and/or the common data store. In at least one of the various embodiments, the indexer application may analyze the events, event information, document information, contexts, roles, relationships, relevancy information, user behaviors, items, queries, query results, third-party services information, or the like to determine additional contexts, relationships, roles, relevancy information, or the like, among the items.

At block 710, in at least one of the various embodiments, information in the common index may be updated based on one or more of the events, event information, document information, contexts, roles, relationships, relevancy information, user behaviors, items, queries, query results, third-party services information, or the like. For example, in at least one of the various embodiments, if the indexer application determines that a user named Joe is a project leader, it may update the common index to reflect that information, such as, items, associated with Joe may be important for persons working on the same project as Joe—which may be the project Joe is leading. In at least one of the various embodiments, the indexer application may access user indexes of other users that may be working on Joe's project and increment a priority value associated with Joe's items. This value may be employed in at least one of the various embodiments, if the indexer application is generating a query result set, the priority value of matching records may in part influence the sort order of the records in the result set. Also, in at least one of the various embodiments, one or more user indexes may be updated to reflect the information determined in block 710. Next, in at least one of the various embodiments, control may be returned to a calling process.

Figure 8:
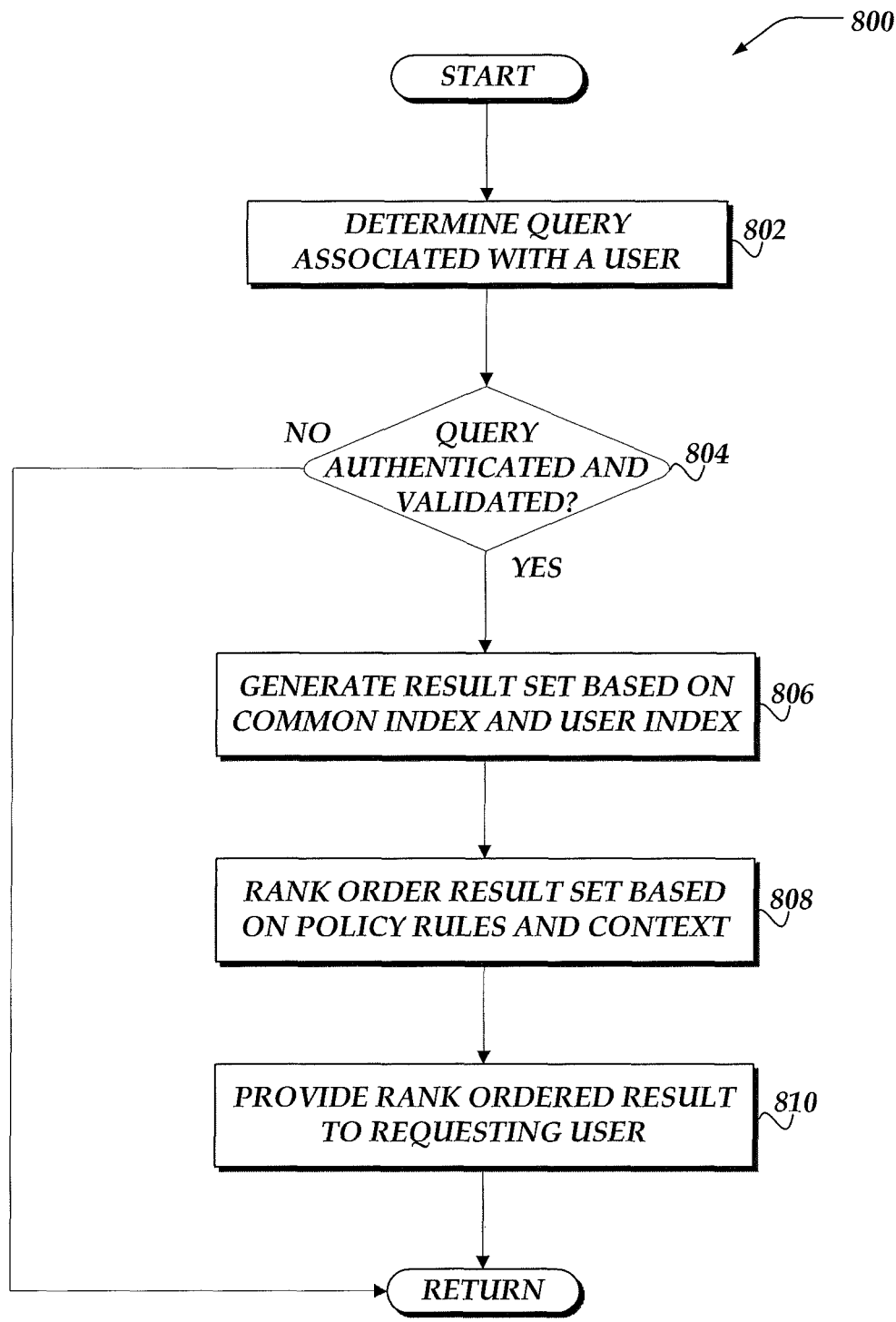
FIG. 8 shows a flowchart of process for responding to queries that may be associated with a user in accordance with at least one of the various embodiments.

FIG. 8 shows a flowchart of process 800 for determining results for queries that may be associated with a user in accordance with at least one of the various embodiments. After a start block, at block 802, in at least one of the various embodiments, a query from a user may be determined. In at least one of the various embodiments, a user may submit a query the indexer application. Also, in at least one of the various embodiments, a client application may submit a query on behalf of a user. For example, in at least one of the various embodiments, an email application may be arranged to submit queries to an indexer server computer. In at least one of the various embodiments, queries may be ad-hoc, comprising, one or more key-value pairs, documents, meta-data or the like.

At decision block 804, in at least one of the various embodiments, if the query is authenticated and validated, control may flow to block 806; otherwise, control may be returned to a calling process. In at least one of the various embodiments, if a query is provided, the indexer application may employ one or more well-known techniques to authenticate the query. In at least one of the various embodiments, authentication may comprise confirming that necessary and sufficient credentials for accessing the user index are provided with the query. Also, in at least one of the various embodiments, the indexer application may validate that the provided query is well-formed and includes information sufficient for performing a query.

At block 806, in at least one of the various embodiments, results responsive the query may be generated using the common index and the user index corresponding to the user associated with the query. In at least one of the various embodiments, indexer application may execute the query to produce at least a result set responsive to the query.

In at least one of the various embodiments, the result set may include records that are sorted based on one or more priority values that may be associated with index record(s) that correspond to the result set record. Further, in at least one of the various embodiments, the result set may be grouped based on characteristics of the results, such as, the type or classification of items (e.g., images, emails, documents, events, people, places, documents, appointments, or the like), age of the items, or the like.

In at least one of the various embodiments, the particular sorting and grouping may be driven by one or more policy based rules that may be included in configuration information, or the like. In some cases, queries may include configuration information that overrides and/or supersedes the information stored in the configuration information.

At block 808, in at least one of the various embodiments, one or more policy rules and/or other information analysis processes may be employed to rank order and/or group the result set records. In at least one of the various embodiments, even though the result set may initially be generated in a sorted and grouped order based on the information provided with the query and/or the information stored in the user index, they may be further modified based on additional policy based rules.

At block 810, in at least one of the various embodiments, the rank ordered result set may be provided to the requesting user and/or user application. In at least one of the various embodiments, the result set may be provided in one or more formats that may be compatible with client application that submitted the query. In at least one of the various embodiments, such formats may include, but are not limited to, XML, JSON, HTML, or the like. Next, in at least one of the various embodiments, control may be returned to a calling process.

Figure 9:
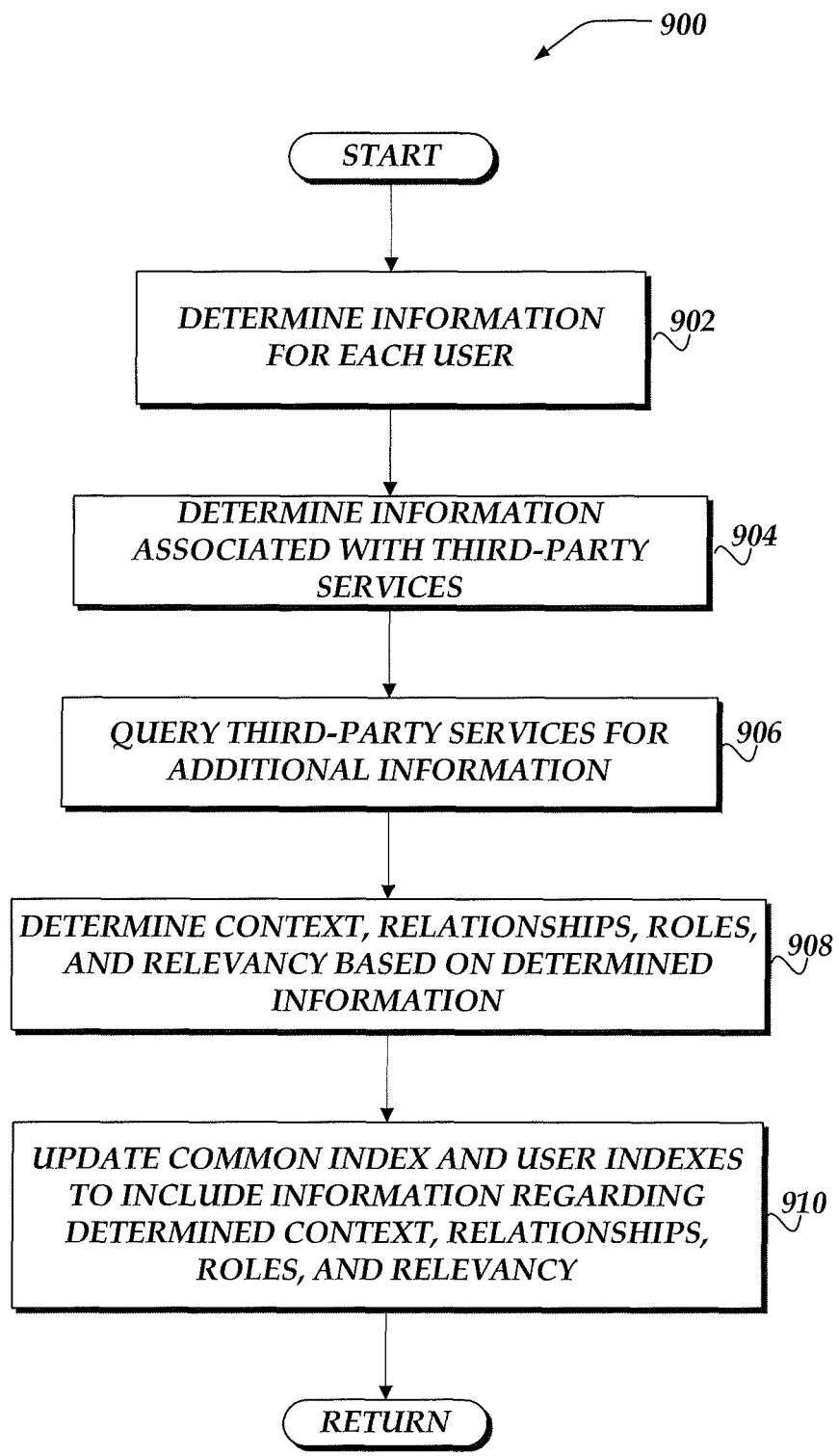
FIG. 9 shows a flowchart of process for updating indexes in accordance with at least one of the various embodiments.

FIG. 9 shows a flowchart of process 900 for updating indexes in accordance with at least one of the various embodiments. After at start block, at block 902, in at least one of the various embodiments, events, event information, document information, contexts, roles, relationships, relevancy information, user behaviors, items, queries, query results, third-party services information, or the like, may be determined for one or more users. In at least one of the various embodiments, applications operative on an indexing server computer, such as indexer application 319, may be arranged to passively or actively determine user information. For example, in at least one of the various embodiments, applications may be arranged to monitor how users interact with email and/or other documents. In at least one of the various embodiments, the indexer application may receive one or more communications, such as, events from applications that may be operative on client computers that may indicate that a user has manipulated an item (e.g., read, deleted, replied, or the like), added or deleted contacts, made or modified appointments, or the like.

Also, in at least one of the various embodiments, indexer application 319 may determine how a user interact information on their client computers. For example, in at least one of the various embodiments, indexer application 319 may be arranged to receive communications over a network from applications on client computers if the user adds, modifies, deletes, or shares information using a client computer. In other cases, the indexer application may monitor items by comparing the information determined at different times. In such cases, the comparisons of information determined at different times may indicate that relevant user interactions have occurred.

In at least one of the various embodiments, the indexer application may be arranged to include a plug-in architecture where additional modules and/or libraries may be added that enable additional and/or different monitoring. In at least one of the various embodiments, the determination of which type of monitoring may be performed may be controlled by one or more policy-based rule sets that may be included in configuration information. In at least one of the various embodiments, different policy based rule sets may be operative at various times depending on how the indexer application may be configured.

Further, in at least one of the various embodiments, indexer application 319 may be arranged to enable additional policy-based rule sets to be added for controlling the monitoring. In at least one of the various embodiments, a indexer application 319 may be arranged such that rules may be supplied in a computer language source code, such as, JavaScript, Perl, Python, Ruby, Java, or the like, enabling policy rules to be custom made for arbitrary and/or ad-hoc circumstances.

At block 904, in at least one of the various embodiments, information that may be generated by and/or associated one or more third-party services may be determined. In at least one of the various embodiments, indexer application 319 may be arranged to actively and/or passively determine interactions of users with third-party services. In at least one of the various embodiments, a client application may be arranged to communicate search engine queries and/or search engine search results to the indexer application. The indexer application may use these results to identify relevancy information for a user. For example, if a user has submitted search queries to third-party services for information about a particular person, the indexer application may use this information to infer that the user is interested in that person. Thus, other items and/or documents that include references to that person may be adjusted to have an increased relevancy.

At block 906, in at least one of the various embodiments, various third-party services may be further queried to generate additional relevancy information, context information, role information, relationship, or the like. In at least one of the various embodiments, if the determined information includes subject matter such as person names, place names, addresses, other proper nouns, or the like, the indexer application may submit such subject matter to one or more third-party services.

In at least one of the various embodiments, the indexer application may further determine the context associated with items by generating and submitting one or more queries to one or more third-party services. The query may be based on at least a portion of the content of one or more items. One or more portions of the result set corresponding to the query may be employed by the indexer application to further determine information that may be associated with the item and/or other context/relevancy information. For example, if a person's name is found in the body of an email, the indexer application my extract the person's name and submit it in a query to a social network to obtain additional information. The information provided by the third-party service may be used in combination with other information available to the indexer application to determine the identity, classification, relationships, role, relevancy, context, or the like, of one or more of the persons matching the query.

In at least one of the various embodiments, information returned from a third-party service may be indefinite with regards to identifying a person. In these cases, the information from the third-party service may be compared and/or combined with other information. For example, if a third-party search for "Jim Doe" returns 100 matches, the indexer application may parse the results to identify additional relevancy indicators, such as, proximity, location, career/work, email addresses, associated persons, associated businesses, interests, or the like. For example, if the indexer application may determine that "Jim Doe" in the result set located in Seattle may be more relevant to a user located in Seattle than a user located in Paris. Likewise, in at least one of the various embodiments, if a particular "Jim Doe" result correlates with a "Jim Doe" listed in one or more of the user indexes of team members of a user, it may indicate a higher relevance for the particular result. Indexer application 319 may cross-reference one or more relevancy indicators to attempt to link the third-party information with the appropriate persons.

At block 908, in at least one of the various embodiments, context information, roles, relationships, relevancy, or the like, may be determined based on an analysis that may employ some or all of the information that may be determined by the indexer application. In at least one of the various embodiments, the determined information may be analyzed and cross-referenced.

In at least one of the various embodiments, relationships between persons and places may be determined based on an analysis of how often and in what context a person appears in the information. For example, persons having the same email address domain name that may have a history of exchanging messages, sharing appointments, sharing documents, or the like, may be determined to be members of a collaborative work team. Thus, the indexer application may determine that information relevant to and/or corresponding one user in the team may be relevant to other users in the team.

In at least one of the various embodiments, leadership roles may be determined based on analysis of which person in a team originates more messages than they are sending. Further, factors, such as, how quickly and/or regularly recipients respond, ownership of documents, ownership of appointments, or the like, may contribute to determining if a user is acting in a leadership role.

In at least one of the various embodiments, additional roles, such as, customers, vendors, supervisors, project managers, assistants, family, friends, or the like, may be determined similarly, albeit using different analysis and/or weighting factors. Also, users may be determined to simultaneously have leadership roles with respect to one group of people and in non-leadership roles with respect to other sets of people.

In at least one of the various embodiments, other factors, such as, proximity, location, career/work, email addresses, associated persons, associated businesses, interests, or the like, may be employed to evaluate the strength and/or relevancy of a determined role or relationship. Further, in at least one of the various embodiments, relevancy information may be determined based on one or more values aggregated across one or more user indexes.

At block 910, in at least one of the various embodiments, the common index and the appropriate user indexes may be updated to include information related to the determined context information, roles, relationships, or associations. In at least one of the various embodiments, if a person is determined to have a role that is relevant to another user, the indexer application may update that other user's index to reflect the person's role. In at least one of the various embodiments, information from one or more user indexes may be required to determine that a person has a given role. Thus, if a role may be determined for a user more than one user index may be updated.

In at least one of the various embodiments, additional relevancy information may be determined from aggregating information from more than one user index. For example, if multiple users only occasionally received messages from Chris, and almost all of the recipients immediately open and read the message from Chris, the indexer application may infer that Chris may be a very important person that generates information that may be very relevant to users. For example, Chris may be a CEO that sends company wide emails occasionally. Thus, indexed information related to Chris may be given higher relevance score. In contrast, if the indexer application was restricted to analyzing information for a single user, it may be unlikely that Chris would have been identified as an import person, since for a given user messages may only be occasionally received from Chris.

In at least one of the various embodiments, in some cases, the roles and/or relevancy of a relationship determined by analyzing other user indexes may be confidential and/or generally unknown. In at least one of the various embodiments, to avoid disclosing confidential relationship and/or roles, the indexer application may perform actions to determine if the information about the relationship is in the public domain. Such information may include, information that may be discovered in public databases, or public social network profiles and thus determined to public knowledge. Thus, in an example, if Chris has a publically available profile photograph, phone number, and email address, this information may be included in results set for queries from client applications. However, in at least one of the various embodiments, a phone number that is shared with only a few people, and it is not determined to be available on public social network profiles, may be determined to a confidential information and thus it may not be shared to client applications.

In at least one of the various embodiments, if confidential information was previously provided to a user by the owner of the confidential information, the indexer application may provide the same otherwise confidential information the same user in response to a query. For example, if a query from John includes information about an upcoming appointment with Chris, the indexer application may respond with, among other things; Chris' public phone number and his private phone number if and only if the indexer application can determine that Chris has previously provided the private number to John. (E.g., this conditional may be satisfied if a prior email from Chris to John included the private phone number,) Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing items over a network, wherein at least one network computer enables actions to be performed, comprising:
    generating at least one user index that corresponds to a user of a plurality of users;
    accessing at least one application to determine at least one item that corresponds to the user, wherein information corresponding to the at least one determined item is listed in the at least one user index;
    storing at least a portion of the at least one determined item in a data store separate from the at least one user index, wherein the at least portion is associated with the user;
    storing at least a portion of information associated with at least one third-party service in the data store, wherein the at least portion of information is associated with the user;
    determining at least one role for the user based on at least information from one or more other user indexes;
    when the at least one role is determined to be in the public domain, providing information about the at least one role in a response to a query from at least one client application;
    determining a context associated with the at least one determined item based on the at least portion of the at least one determined item, third party service information and the at least portion of information associated with the user, wherein the third party service information is based on a provided result from a query of the at least one third-party service by a server application regarding the at least portion of the at least one determined item; and
    updating the at least one user index based on the determined context.

2. The method of claim 1, wherein determining the context, further comprises, employing information listed in at least one other user index to further determine the context associated with the at least one determined item.

3. The method of claim 1, further comprising, determining the least one role based on the at least one determined item and the at least one user index, wherein the at least one determined role is at least one of a customer, a vendor, a supervisor, a project manager, an assistant, a family member, or, a casual friend.

4. The method of claim 1, further comprising, determining relevancy information for the at least one determined item based on information listed in at least one other user index.

5. The method of claim 1, wherein updating the at least one user index, further comprises, updating the at least one user index and at least one other user index based on the determined context information.

6. The method of claim 1, wherein accessing the at least one application, further comprises, classifying the at least one determined item based on at least one classification type, wherein the at least one classification type is at least one of a person, a project, a message, a document, a meeting, an appointment, a location, or a company.

7. The method of claim 1, further comprising, generating a common index that includes information for the at least one item that is sharable with at least a portion of the plurality of users.

8. A system for managing items, comprising:
    a network computer, including:
        a transceiver for communicating over the network;
        a memory for storing at least instructions;
        a processor device that is operative to execute instructions that enable actions, including:
            generating at least one user index that corresponds to a user of a plurality of users;
            accessing at least one application to determine at least one item that corresponds to the user, wherein information corresponding to the at least one determined item is listed in the at least one user index;
            storing at least a portion of the at least one determined item in a data store separate from the at least one user index, wherein the at least portion is associated with the user;
            storing at least a portion of information associated with at least one third-party service in the data store, wherein the at least portion of information is associated with the user;
            determining at least one role for the user based on at least information from one or more other user indexes;
            when the at least one role is determined to be in the public domain, providing information about the at least one role in a response to a query from at least one client application;
            determining a context associated with the at least one determined item based on the at least portion of the at least one determined item, third party service information and the at least portion of information associated with the user, wherein the third party service information is based on a provided result from a query of the at least one third-party service by a server application regarding the at least portion of the at least one determined item; and
            updating the at least one user index based on the determined context; and
    a client computer, including:
        a transceiver for communicating over the network;
        a memory for storing at least instructions;
        a processor device that is operative to execute instructions that enable actions, including:
            generating at least one event; and
            displaying at least one result based on the determined context.

9. The system of claim 8, wherein determining the context, further comprises, employing information listed in at least one other user index to further determine the context associated with the at least one determined item.

10. The system of claim 8, further comprising, determining the least one role based on the at least one determined item and the at least one user index, wherein the at least one determined role is at least one of a customer, a vendor, a supervisor, a project manager, an assistant, a family member, or, a casual friend.

11. The system of claim 8, further comprising, determining relevancy information for the at least one determined item based on information listed in at least one other user index.

12. The system of claim 8, wherein updating the at least one user index, further comprises, updating the at least one user index and at least one other user index based on the determined context information.

13. The system of claim 8, wherein accessing the at least one application, further comprises, classifying the at least one determined item based on at least one classification type, wherein the at least one classification type is at least one of a person, a project, a message, a document, a meeting, an appointment, a location, or a company.

14. The system of claim 8, further comprising, generating a common index that includes information for the at least one item that is sharable with at least a portion of the plurality of users.

15. A network computer for managing items, comprising:
a transceiver for communicating over the network;
a memory for storing at least instructions;
a processor device that is operative to execute instructions that enable actions, including:
generating at least one user index that corresponds to a user of a plurality of users;
accessing at least one application to determine at least one item that corresponds to the user, wherein information corresponding to the at least one determined item is listed in the at least one user index;
storing at least a portion of the at least one determined item in a data store separate from the at least one user index, wherein the at least portion is associated with the user;
storing at least a portion of information associated with at least one third-party service in the data store, wherein the at least portion of information is associated with the user;
determining at least one role for the user based on at least information from one or more other user indexes;
when the at least one role is determined to be in the public domain, providing information about the at least one role in a response to a query from at least one client application;
determining a context associated with the at least one determined item based on the at least portion of the at least one determined item, third party service information and the at least portion of information associated with the user, wherein the third party service information is based on a provided result from a query of the at least one third-party service by a server application regarding the at least portion of the at least one determined item; and
updating the at least one user index based on the determined context.

16. The network computer of claim 15, wherein determining the context, further comprises, employing information listed in at least one other user index to further determine the context associated with the at least one determined item.

17. The network computer of claim 15, further comprising, determining the at least one role based on the at least one determined item and the at least one user index, wherein the at least one determined role is at least one of a customer, a vendor, a supervisor, a project manager, an assistant, a family member, or, a casual friend.

18. The network computer of claim 15, further comprising, determining relevancy information for the at least one determined item based on information listed in at least one other user index.

19. The network computer of claim 15, wherein updating the at least one user index, further comprises, updating the at least one user index and at least one other user index based on the determined context information.

20. The network computer of claim 15, wherein accessing the at least one application, further comprises, classifying the at least one determined item based on at least one classification type, wherein the at least one classification type is at least one of a person, a project, a message, a document, a meeting, an appointment, a location, or a company.

21. A processor readable non-transitive storage media that includes instructions for managing items over a network, wherein a computer that executes at least a portion of the instructions is enabled to perform actions:
generating at least one user index that corresponds to a user of a plurality of users;
accessing at least one application to determine at least one item that corresponds to the user, wherein information corresponding to the least one determined item is listed in the at least one user index;
storing at least a portion of the at least one determined item in a data store separate from the at least one user index, wherein the at least portion is associated with the user;
storing at least a portion of information associated with at least one third-party service in the data store, wherein the at least portion of information is associated with the user;
determining at least one role for the user based on at least information from one or more other user indexes;
when the at least one role is determined to be in the public domain, providing information about the at least one role in a response to a query from at least one client application;
determining a context associated with the at least one determined item based on the at least portion of the at least one determined item, third party service information and the at least portion of information associated with the user, wherein the third party service information is based on a provided result from a query of the at least one third-party service by a server application regarding the at least portion of the at least one determined item; and
updating the at least one user index based on the determined context.

22. The media of claim 21, wherein determining the context, further comprises, employing information listed in at least one other user index to further determine the context associated with the at least one determined item.

23. The media of claim 21, further comprising, determining the least one role based on the at least one determined item and the at least one user index, wherein the at least one determined role is at least one of a customer, a vendor, a supervisor, a project manager, an assistant, a family member, or, a casual friend.

24. The media of claim 21, wherein updating the at least one user index, further comprises, updating the at least one user index and at least one other user index based on the determined context information.

25. The media of claim 21, wherein accessing the at least one application, further comprises, classifying the at least one determined item based on at least one classification type, wherein the at least one classification type is at least one of a person, a project, a message, a document, a meeting, an appointment, a location, or a company.

26. The media of claim 21, further comprising, generating a common index that includes information for the at least one item that is sharable with at least a portion of the plurality of users.

* * * * *